Oct. 8, 1940.  PETER-KONRAD HERMANN  2,217,443
ELECTRIC VALVE CIRCUITS
Filed May 12, 1938  2 Sheets-Sheet 2
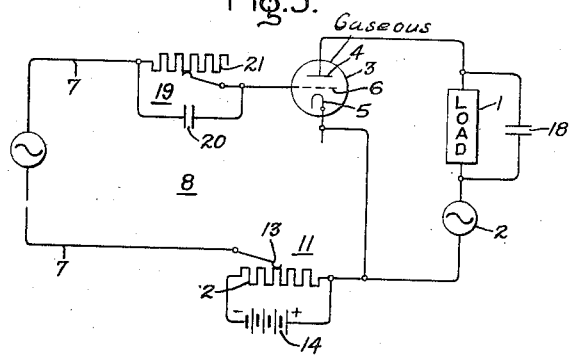
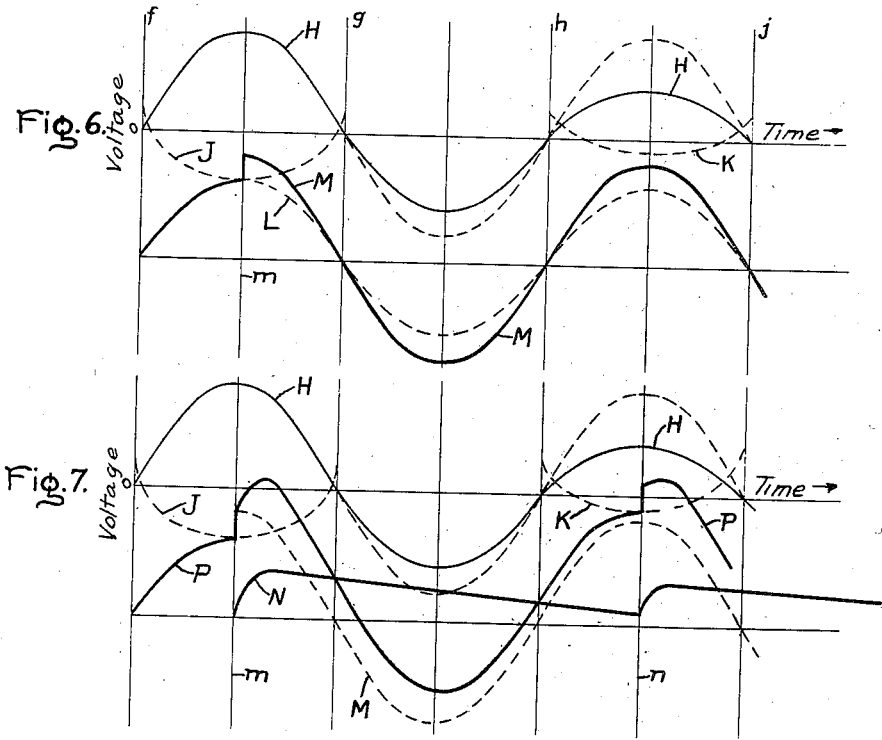
Inventor:
Peter Konrad Hermann,
by Harry E. Dunham
His Attorney.

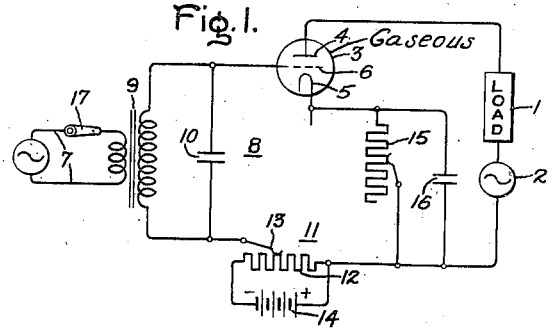
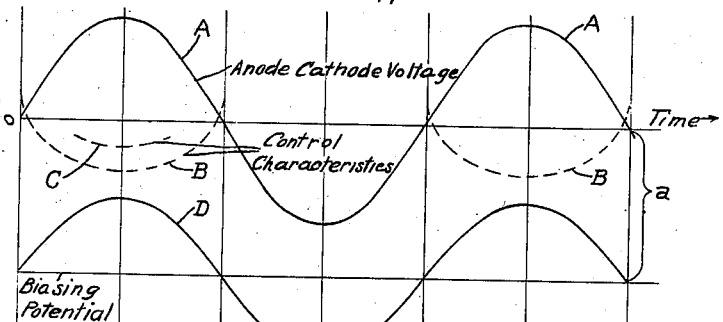
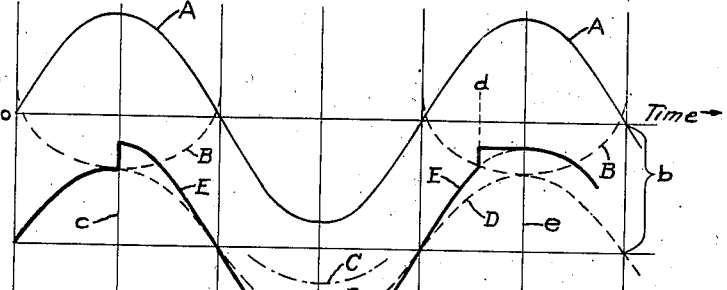
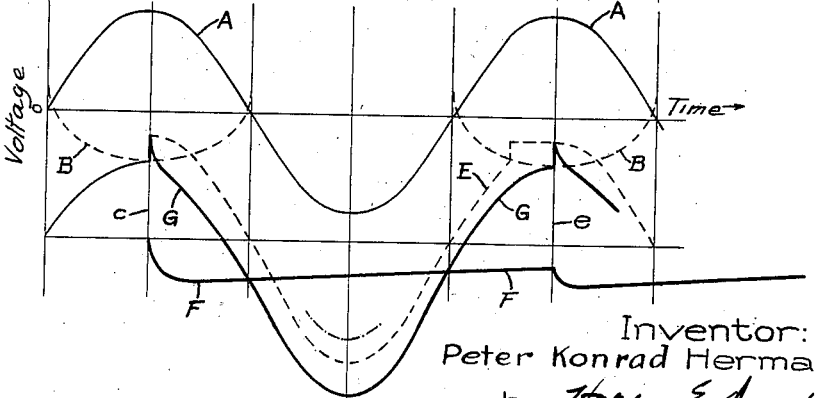

Patented Oct. 8, 1940

2,217,443

UNITED STATES PATENT OFFICE

2,217,443

ELECTRIC VALVE CIRCUITS

Peter-Konrad Hermann, Berlin-Zehlendorf, Germany, assignor to General Electric Company, a corporation of New York Application May 12, 1938, Serial No. 207,581
In Germany June 2, 1937

7 Claims. (Cl. 250—27)

My invention relates to electric valve circuits and more particularly to control or excitation circuits for electric valves.

In the control of electric valve apparatus of the type employing ionizable mediums, such as gases or vapors, it is important in many applications to provide circuits which render the electric valves conductive at precisely the same value of a control voltage. For example, in control systems where it is desirable to effect energization of an associated reactive load circuit, such as a relay circuit, with precision and uniformity with respect to a control voltage, it has been found that changes in load circuit impedance, anode-cathode voltage, and transient disturbances in the control or excitation circuit cause the electric valves to be rendered conductive at values of control member voltage different from that contemplated or intended. This is particularly true in connection with circuits which are periodically energized and where the load circuits include reactive elements such as capacitances or inductances. In many relay circuits, it is desirable to effect energization of a control device with great precision. In accordance with the teaching of my invention described hereinafter, I provide a control circuit including an electric valve of the type employing an ionizable medium and in which the electric valve is rendered conductive at a predetermined exact instantaneous value of control voltage irrespective of transients due to the impedance of the load circuit, and irrespective of disturbances in the control or excitation circuit.

Furthermore, it is important in certain types of relay circuits to employ apparatus which has the same "pick-up" and "drop-out" values. As is well known, electric valves of the type employing ionizable mediums may be used for this purpose because of the critical control voltage characteristics of these valves. However, in the prior art arrangements using these valves much of the desired precision of operation may be lost due to the transient voltages which may be present in the anode-cathode and excitation circuits. In accordance with the teachings of my invention described hereinafter, I provide arrangements which permit the use of electric valves of the gaseous or vapor type in relay control circuits, and which assure precision and uniformity in the "pick-up" and "drop-out" values.

It is an object of my invention to provide new and improved electric valve circuits.

It is another object of my invention to provide new and improved control or excitation circuits for electric valve means of the type employing an ionizable medium.

It is a further object of my invention to provide new and improved control systems for electric valve apparatus of the type employing an ionizable medium and in which a load circuit is energized precisely in accordance with a predetermined instantaneous value of a controlling voltage.

In accordance with the illustrated embodiments of my invention, I provide new and improved control or excitation circuits for electric valve means of the type employing an ionizable medium so that the electric valve is always rendered conductive precisely at a predetermined value of a control voltage which is impressed on the control member or grid of the electric valve means. To neutralize the effect of transient voltages in the control or excitation circuit occasioned by the reactance of the excitation circuit or by the positive ion current which flows in the excitation circuit, due to the ionizable medium of the electric valve means, I provide a parallel connected resistance and a capacitance which are interposed between the anode-cathode circuit and the excitation circuit to introduce therein a unidirectional voltage which tends to compensate for the variations in the control member voltage caused by these factors. In another embodiment of my invention, I provide a reactive element, such as a capacitance, connected in the excitation circuit for the electric valve to compensate for the variations in the control characteristic of the electric valve due to fluctuations in the anode-cathode voltage, so that the electric valve means is always rendered conductive at the same value of control member voltage.

For a better understanding of my invention, reference may be had to the following description taken in connection with the accompanying drawings and its scope will be pointed out in the appended claims.

Fig. 1 of the accompanying drawings diagrammatically illustrates an embodiment of my invention as applied to an electric valve circuit in which means are provided for modifying the control member voltage to compensate for disturbances in the excitation circuit occasioned by the positive ion current of an electric valve which employs an ionizable medium; Figs. 2, 3 and 4 represent certain operating characteristics of the arrangement shown in Fig. 1; Fig. 5 diagrammatically illustrates another embodiment of my invention as applied to an electric valve circuit in which the excitation circuit includes means for modifying the control member voltage to compensate for variations in the control characteristic of the electric valve means due to changes in the anode-cathode voltage, and Figs. 6 and 7 represent certain operating characteristics of the arrangement of Fig. 5.

Referring now to Fig. 1 of the drawings, my invention is diagrammatically illustrated as applied to an electric valve circuit for energizing a reactive load circuit or device, such as a relay 1, from an alternating current circuit 2 by means of an electric valve means 3 which is of the type employing an ionizable medium and which comprises an anode 4, a cathode 5 and a control member 6. The load device or relay 1 is arranged to be energized at a definite or exact value of a control voltage which is provided by an alternating current circuit 7. The control voltage may be impressed on the control member 6 of the electric valve means 3 through an excitation circuit 8 for the electric valve means. The excitation circuit 8 includes a transformer 9 and a capacitance 10 which serves to suppress overvoltages in the excitation circuit. To introduce into the excitation circuit a negative unidirectional biasing potential, I provide a suitable arrangement such as a voltage divider 11 including a resistance element 12, an adjustable contact 13 and a suitable source of unidirectional voltage, such as a battery 14, which energizes the resistance 12.

To introduce into the excitation circuit 8 a voltage to compensate for disturbances introduced into the excitation circuit by the reactance of the excitation circuit or by the positive ion current of the electric valve means 3, I provide a parallel connected resistance 15 and a capacitance 16 which are interposed between the anode-cathode circuit of the electric valve means 3 and the excitation circuit 8. The parallel connected resistance 15 and capacitance 16 are arranged to introduce into the excitation circuit 8 a unidirectional voltage which modifies the control voltage, so that the electric valve means 3 is rendered conductive at precisely the same value of the control voltage, thereby neutralizing the effect of the disturbances in the excitation circuit 8. A switch 17 may be connected between the source of control voltage 7 and the transformer 9.

The operation of the embodiment of my invention diagrammatically illustrated in Fig. 1 will be explained by considering the system when it is desired to effect energization of the load device or relay 1 in accordance with the magnitude of the control voltage provided by circuit 7. Of course, as is well understood by those skilled in the art, the relay 1 will be energized when the voltage impressed on the control member 6 is equal to or greater than the critical control characteristic for the particular electric valve employed. In the arrangement shown, the electric valve means 3 will transmit current to the load circuit 1 during the positive half cycles of applied anode-cathode voltage.

Due to the flow of positive ion current through the excitation circuit 8, the control voltage introduced into the excitation circuit by the transformer 9 will be modified so that there is a substantial change in the time during the positive half cycles at which the electric valve means 3 is rendered conductive. However, due to the presence of the resistance 15 and the capacitance 16, there is introduced into the excitation circuit 8 a unidirectional voltage which tends to compensate for the changes in the control member voltage occasioned by the positive ion current. In this manner, the electric valve means 3 is always rendered conductive at a precisely determined value of the control voltage.

For a better understanding of the operation of the embodiment of my invention shown in Fig. 1, reference may be had to the operating characteristics shown in Figs. 2-4. Curve A of Fig. 2 represents the alternating voltage applied to the anode and cathode of electric valve means 3 by the alternating current source 2. Curve B represents the critical control characteristic for the electric valve means 3, that is, the minimum voltage which must be impressed on the control member 6 to render the electric valve means 3 conductive for the particular value of the applied anode-cathode voltage. Curve C, of course, represents the critical control characteristic of the electric valve means 3 for a lower value of applied anode-cathode voltage, that is, for an alternating voltage of substantially smaller magnitude. Curve D represents the alternating voltage introduced into the excitation circuit 8 by transformer 9 and the control circuit 7. The distance $a$ represents the magnitude of the negative unidirectional biasing potential introduced into the excitation circuit by means of the voltage divider 11. Since the alternating voltage introduced into the excitation circuit 8 by transformer 9 does not intersect the control characteristic B, the electric valve means 3 remains nonconductive. However, in Fig. 3 the operating characteristics are represented when the electric valve means 3 is rendered conductive by decreasing the magnitude of the negative unidirectional biasing potential to a value $b$. The curve D which represents the alternating control voltage introduced into the excitation circuit, is here represented as a broken curve. For the particular value of the negative unidirectional biasing potential shown in Fig. 3, the electric valve means 3 will be rendered conductive at time $c$, where the curve D intersects the control characteristic B. The heavy curve E represents the resultant voltage impressed on the control member 6 of the electric valve means 3. It will be noted that at time $c$ the control voltage rises appreciably due to the flow of positive ion current in the excitation circuit 8, and as a result the magnitude of the resultant control voltage in the excitation circuit 8 is materially increased so that in the second positive half cycle of applied anode-cathode voltage, in the absence of any compensating apparatus, the electric valve means 3 will be rendered conductive at time $d$, whereas it is desired that the electric valve be rendered conductive at the time $e$.

Fig. 4 represents certain operating characteristics of the circuit of Fig. 1 when the compensating elements including the resistance 15 and the capacitance 16 introduce a compensating voltage into the excitation circuit 8, so that the electric valve means 3 is always rendered conductive at the same time during each cycle of applied anode-cathode voltage. The parallel connected resistance 15 and the capacitance 16 introduce into the excitation circuit a negative unidirectional voltage, as represented by curve F, which compensates for the disturbances in the excitation circuit occasioned by the reactance of the excitation or by the positive ion current. Curve G represents the resultant control member voltage as modified by the compensating potential. It will be noted that the electric valve means 3 is rendered conductive at precisely the same time during the positive half cycles of applied anode-cathode voltage. In other words, will be noted that there is no advancement in phase of the time at which the electric valve means 3 is rendered conductive during the second half cycle of applied anode-cathode voltage with respect to the first half cycle. By virtue of the compensating effect of the resistance 15 and capacitance 16, the electric valve means 3 is always rendered conductive at the same instantaneous value of the voltage of circuit 7, thereby neutralizing the effect of any disturbances in the excitation circuit 8 occasioned by the positive ion current of the electric valve means 3.

By introducing into the excitation circuit 8 a voltage which compensates for voltage transients occasioned by the reactance of the load circuit or the reactance of the excitation circuit, it is seen that the system effects precise energization and deenergization of the load device or relay 1. In other words, the system responds to very small changes in the instantaneous value of the control voltage provided by circuit 7 to effect energization and deenergization of relay 1. This feature makes the system particularly applicable to relay circuits where it is desired to obtain rather close agreement between the "pick-up" and the "drop-out" values.

Fig. 5 represents another embodiment of my invention which is similar in many respects to the arrangement shown in Fig. 1 and corresponding elements have been assigned like reference numerals. The arrangement shown in Fig. 5 is intended to respond precisely to a predetermined value of the control voltage provided by circuit 8, irrespective of variations in the control characteristic of the electric valve means 3 occasioned by changes in the applied anode-cathode voltage. In other words, the load device 1 is energized when the voltage of circuit 8 attains a predetermined value within reasonable variations in the magnitude of the anode-cathode voltage of electric valve means 3.

In many applications, such as electromagnetic relays which are energized through a unidirectional conducting device from an alternating current source, it is desired to connect across the actuating element or coil of the relay a capacitance in order to transmit to the actuating element of the relay a substantially constant unidirectional current. A capacitance 18 may be connected across the load device 1 for this purpose. However, the presence of the capacitance 18 in the anode-cathode circuit of the electric valve means 3 occasions transient changes in the voltage applied across the anode and cathode of the electric valve means 3. These changes in voltage, of course, cause changes in the critical control characteristic of the electric valve means 3, thereby causing, in the absence of compensating apparatus, undesirable variations in the operation of the electric valve means 3 with respect to the voltage of the circuit 7. To modify the control member potential so that the electric valve means 3 is always rendered conductive at the same value of the control voltage, I provide a means 19 which may include a suitable reactive element, such as a capacitance 20, which is connected in series relation with the control member 6 in excitation circuit 8. An adjustable impedance, such as an adjustable resistance 21, may be connected in parallel relation with the capacitance 20.

The operation of the embodiment of my invention diagrammatically illustrated in Fig. 5 will be explained by considering the system when it is desired to effect energization of the load device 1 from the alternating current circuit 2 in accordance with the magnitude of the voltage of circuit 7. The operating characteristics shown in Figs. 6 and 7 may be considered to explain the operation of the system of Fig. 5. Curve H represents the anode-cathode voltage impressed on electric valve means 3 by the alternating current source 2. It will be noted that the magnitude of the anode-cathode voltage during the interval f—g is substantially greater than the magnitude during the interval h—j. Furthermore, it will be noted that the control characteristics during these intervals, as represented by curves J and K, are substantially different, that is, the critical control voltage characteristic increases in a positive direction as the anode-cathode voltage is decreased in magnitude. Curve L represents the alternating control voltage provided by circuit 7. The electric valve means 3 will be rendered conductive during the first positive half cycle at time m when the control voltage, as represented by the curve L, intersects the characteristic voltage J. Due to the reactance of the load circuit or due to the reactance of the anode-cathode circuit, the voltage impressed across the anode and cathode of electric valve means 3 is decreased during the interval h—j so that the resultant control member voltage, as represented by curve M, does not intersect the control characteristic K. Therefore, in the absence of compensating means, the electric valve means 3 would not be rendered conductive during the second positive half cycle. The number of intervening half cycles during which the electric valve means 3 fails to become conductive, of course, would depend upon the constants of the circuit and the characteristic of the electric valve employed. However, by the use of the capacitance 20 and resistance 21, which is connected in series relation with the control member 6 of the electric valve means 3, there is introduced into the excitation circuit 8 a positive unidirectional biasing potential which modifies the resultant control member voltage, so that the electric valve means 3 is rendered conductive at the same time during the half cycles following the first half cycle of conduction. Referring more particularly to the operating characteristics of Fig. 7, curve N represents the positive unidirectional voltage introduced into the excitation circuit by the parallel connected resistance 21 and the capacitance 20, and curve P represents the resultant voltage impressed on the control member 6. It will be noted that the electric valve means 3 is rendered conductive at times m and n during the first and second positive half cycles of applied anode-cathode voltage. That is, the resultant control member voltage is increased to compensate for the changes in the control characteristic of the electric valve occasioned by the reactance of the load circuit supplied by the electric valve.

It is to be understood that by virtue of the above described compensating or neutralizing connections, it is possible to effect energization of a load circuit or a relay at an accurately determinable instantaneous value of a control voltage, irrespective of the disturbances introduced into the excitation circuit caused by the reactance of the load or excitation circuit or caused by the positive ion current which flows in the excitation circuit due to the ionizable medium of the electric valve means.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current supply circuit, a reactive load circuit, electric valve means connected between said circuits and being of the type employing an ionizable medium and including an anode, a cathode and a control member, an excitation circuit connected between said cathode and said control member including a source of biasing potential, a source of periodic voltage connected in said excitation circuit to render said electric valve means conductive periodically at the same predetermined instant intermediate the zero values of the voltage during the initial and each succeeding half cycle of voltage of a given polarity of said supply circuit, and means for modifying said periodic voltage to neutralize the effect of the transient voltages occasioned by the periodic energization of the reactive load circuit so that said electric valve means is rendered conductive at the same instant during each of said half cycles.

2. In combination, a supply circuit, a load circuit, electric valve means connected between said circuits and being of the type employing an ionizable medium and having an anode, a cathode and a control member, an excitation circuit including means for impressing on said control member a voltage to render said electric valve means conductive at the same predetermined time intermediate the zero values of the voltage during the initial and each succeeding half cycle of voltage of a given polarity of said supply circuit, and means common to the anode-cathode circuit and said excitation circuit for modifying said voltage so that said electric valve means is rendered conductive at the same time during cycles of anode-cathode voltage irrespective of the transient voltages in the load circuit.

3. In combination, an alternating current supply circuit, a load circuit, electric valve means connected between said circuits and being of the type employing an ionizable medium and having an anode, a cathode and a control member, an excitation circuit comprising means connected between said cathode and said control member for impressing on said control member a periodic voltage to render said electric valve means conductive periodically at the same predetermined time intermediate the zero values of the voltage during the initial and each succeeeding half cycle of voltage of a given polarity of said supply circuit, and means common to the anode-cathode circuit and said excitation circuit for modifying said periodic voltage to compensate for disturbances in the excitation circuit caused by the positive ion current so that said electric valve means is rendered conductive at the same time during cycles of applied anode-cathode voltage.

4. In combination, an alternating current supply circuit, a load circuit, electric valve means connected between said circuits and being of the type employing an ionizable medium and having an anode, a cathode and a control member, an excitation circuit comprising means connected between said cathode and said control member for impressing on said control member a voltage to render said electric valve means conductive at the same predetermined time intermediate the zero values of the voltage during the initial and each succeeding half cycle of voltage of a given polarity of said supply circuit, and means comprising a parallel connected capacitance and a resistance common to said excitation circuit and the anode-cathode circuit of said electric valve means for introducing into the excitation circuit a unidirectional voltage derived from the anode-cathode circuit to compensate for the fluctuations in the control member voltage caused by positive ion current so that said electric valve means is rendered conductive at the same time during each cycle of applied anode-cathode voltage.

5. In combination, an alternating current supply circuit, a load circuit, an electric valve means connected between said circuits and being of the type employing an ionizable medium having an anode, a cathode and a control member, an excitation circuit including means connected between said cathode and said control member and comprising a source of periodic voltage for rendering said electric valve conductive periodically at the same predetermined time intermediate the zero values of the voltage during the initial and each succeeding half cycle of voltage of a predetermined polarity of said supply circuit, and means for introducing into said excitation circuit a voltage to compensate for variations in the control characteristic of said electric valve means occasioned by the reactance of the anode-cathode circuit so that said electric valve means is rendered conductive at the same instantaneous value of the voltage of said source during consecutive half cycles of applied anode-cathode voltage.

6. In combination, a supply circuit, a load circuit, electric valve means connected between said circuits and being of the type employing an ionizable medium and having an anode, a cathode and a control member, an excitation circuit including means connected between said cathode and said control member for impressing on said control member a voltage to render said electric valve means conductive at the same predetermined time intermediate the zero values of the voltage during the initial and each succeeding half cycle of voltage of a predetermined polarity of said supply circuit, and means for introducing into the excitation circuit a voltage to compensate for variations in the control characteristic of said electric valve means due to fluctuations in the anode-cathode voltage so that said electric valve means is rendered conductive at the same time during each cycle of applied anode-cathode voltage.

7. In combination, a supply circuit, a load circuit, electric valve means connected between said circuits and being of the type employing an ionizable medium and having an anode, a cathode and a control member, an excitation circuit including means connected between said cathode and said control member for impressing on said control member a voltage to render said electric valve means conductive at the same predetermined time intermediate the zero values of the voltage during the initial and each succeeeding half cycle of voltage of a predetermined polarity of said supply circuit, and means comprising a reactive element connected in said excitation circuit for introducing into said excitation circuit a voltage to compensate for the variations in the control characteristic of said electric valve means due to fluctuations in the anode-cathode voltage so that said electric valve means is rendered conductive at the same time during each cycle of applied anode-cathode voltage.

PETER-KONRAD HERMANN.